Patented Sept. 15, 1936

2,054,638

UNITED STATES PATENT OFFICE 2,054,638

AMIDES OF HIGHER ALIPHATIC CARBOXYLIC ACIDS AND THEIR PRODUCTION

Erik Schirm, Dessau/Anhalt, Germany, assignor to Deutsche Hydrierwerke Aktiengesellschaft, Berlin-Charlottenburg, Germany, a corporation of Germany No Drawing. Application June 6, 1935, Serial No. 25,211. In Germany June 6, 1934

6 Claims. (Cl. 260—124)

It has been found that the amides of high molecular fatty acids (e. g., arachidic, behenic, montanic or higher molecular fatty acids or their mixtures) substituted on the nitrogen by long chain alkyl radicals are artificial waxes of valuable qualities.

The preparation of these amides may take place according to known methods, for example, by condensation of the fatty acids, their anhydrides or halogenides, in the presence or absence of indifferent diluents, and, if necessary, of acid-binding substances with high molecular, primary aliphatic amines such as docosyl amine and similar compounds.

Owing to their high oil-binding power, the new artificial waxes are excellent for the preparation of agents for surface treatment of all kinds, as e. g. shoe polishes, floor polishes, etc. Furthermore, the new waxes can be used for the manufacture of covering masses for stencils and for the preparation of color substances for copying and carbon papers. As the waxes possess also a very good emulsification power, they are further suited for preparing textile finishings, and the like. For the purposes mentioned, mixtures of the new artificial waxes with known waxes and wax-like substances are also useable, however.

Therefore, it is not necessary to prepare these new artificial waxes fully pure in all cases. One can heat to a high temperature waxes which are found in nature and which possess a certain constituent of free fatty acids with an amount of amine which corresponds to this constituent until the free fatty acid has changed into acid amide. A directly useable mixture of the new artificial waxes with a neutral wax ester is obtained in such a manner.

However, one can also obtain mixtures of the new artificial waxes with other wax-like substances in such a way that natural waxes, if necessary after a preceding hydrogenation as, for example, in connection with sperm oil, are saponified in a watery or alcoholic medium, then a high molecular aliphatic amine is added to the mixture containing free fatty acid and free fatty alcohol, and the mixture is heated to a high temperature. In such a way, a mixture of the new artificial waxes with free high molecular fatty alcohols, which likewise possesses valuable technical qualities, is obtained.

*Example 1*

312 parts of arachidic acid by reaction with an excess of thionyl chloride are changed into the corresponding acid chloride. The latter, after the removal of the surplus of thionyl chloride, is diluted with xylene, and while stirring, it is added to a concentrated solution of 325 parts of docosyl amine in xylene, which besides contains 160 parts of pyridine. Heat up for some time to water-bath temperature, render alkaline with soda solution, and remove pyridine and xylene with water vapor. The remaining arachidic acid docosyl amide is a valuable artificial wax of a high oil-binding power, which with advantage can be used for the known intended uses of waxes.

*Example 2*

400 parts by weight of bleached montanic acid of the acid number 140 (melting point 77–81° C.) are heated together with 325 parts by weight of docosylamine slowly until 245° C. After the development of water vapor is finished and the mixture is cooled down the condensation product congeals at 83° C. and forms a yellowish wax of excellent oil-binding power. This product may be employed in all branches of industry which use waxes for the manufacture of compositions for surface treatment of all kinds, of textile dressings, of isolating masses, of wax papers and so on.

I claim:

1. An N-docosyl substituted amide of an aliphatic monocarboxylic acid wherein the acyl radical contains twenty or more carbon atoms.

2. The N-docosyl amide of arachidic acid.

3. A process of making the N-docosyl amide of arachidic acid which comprises heating arachidic acid chloride with docosyl amine in a solvent medium composed of xylene and pyridine.

4. The N-docosyl amide of bleached montanic acid.

5. A process of making the N-docosyl amide of bleached montanic acid which comprises heating a mixture of bleached montanic acid with docosyl amine until water vapor is no longer given off by the reaction mixture.

6. A process of making an N-docosyl substituted amide which comprises condensing docosyl amine with a substance selected from the group consisting of higher aliphatic monocarboxylic acids containing twenty or more carbon atoms, the anhydrides of said acids, and the halogenides of said acids.

ERIK SCHIRM.